United States Patent Office.

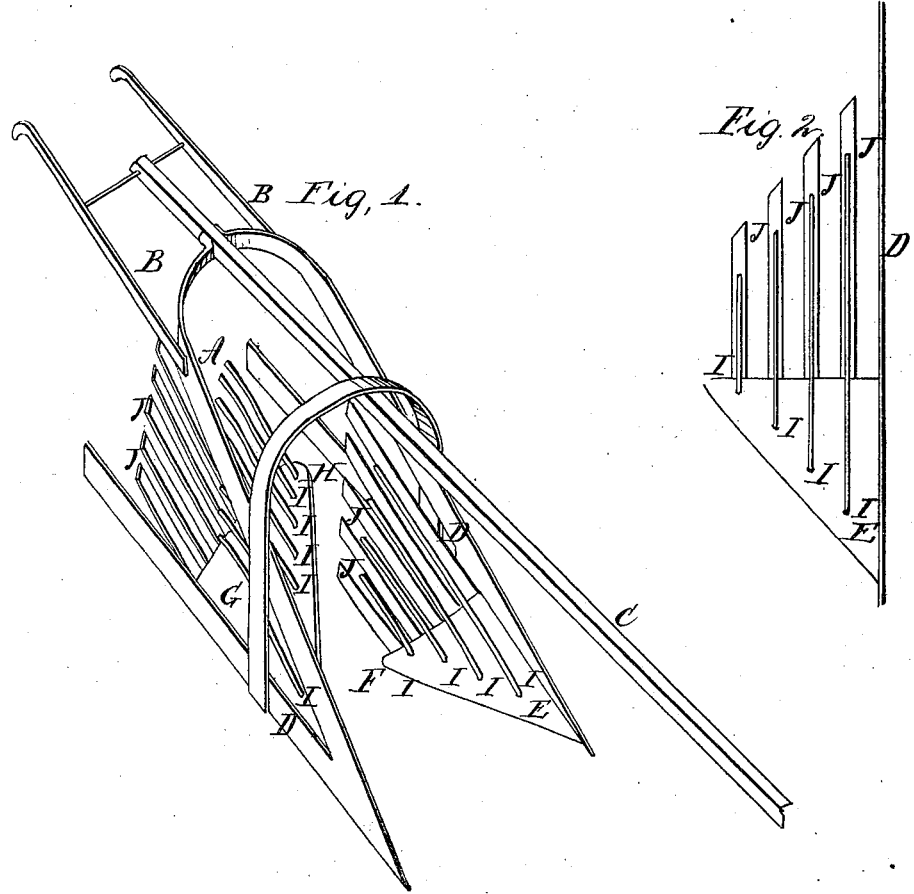

ROBERT DUNLAP, 1ST, OF SOUTH LYONS, MICHIGAN.

*Letters Patent No. 92,024, dated June 29, 1869.*

IMPROVEMENT IN POTATO-DIGGER.

The Schedule referred to in these Letters Patent and making part of the same.

*To whom it may concern:*

Be it known that I, ROBERT DUNLAP, 1st, of South Lyons, in the county of Oakland, and State of Michigan, have invented a new and useful Improvement in Potato-Diggers; and I do declare that the following is a true and accurate description thereof, reference being had to the accompanying drawings, and to the letters of reference marked thereon, and being a part of this specification.

Figure 1 is a perspective view of my invention.

Figure 2 is a plan view of the top of one of the shares.

Like letters indicate like parts in each figure.

The nature of this invention relates to an improvement in the construction of implements for digging potatoes; and consists in a suitable frame, intended to straddle the rows, to which are attached two landsides, provided with pointed shares, one to the inner side of each landside, in such a manner that one of said shares passes under a portion of the hill before the other reaches it, both these shares being so arranged and provided with gratings, as to first throw the potatoes, as they are excavated, toward a common centre, when the prolongation of one of said shares and gratings will throw them to one side, leaving them in a row, instead of scattered over the ground, as in the employment of machines for a similar purpose, the whole being arranged with special reference to securing greater ease of draught, and less labor in picking up the potatoes.

A, in the drawings, represents a suitable frame, made of any suitable material, and provided with handles, B, for guiding the implement, and beam, C, to which to attach a team.

D are landsides, secured to the frame, and should be of about the same length as that of the shares and their gratings.

E is a combined point and share, or cutter, secured to one of the landsides, near its forward end, the inner and rear wing of said cutter just beyond the longitudinal centre of the implement, as shown at F. This cutter may be made of steel or iron, as is most desirable.

G is another cutter, or point and share, attached to the opposite landside, the point being secured to said landside, nearly as far back as the point directly opposite the wing F, and in such position that the cutter E will have passed under the hill before the cutter G will enter. This cutter is elongated until its wing H projects beyond and in rear of the wing F of the cutter E, as shown in fig. 1.

I is a series of metal-rods, secured to the cutters E and G, a little in rear of and in line with the cutting-edges. Thence, with an upward and backward curvature, they project to the rear, beyond the rear line of the cutters, and are secured at suitable distances apart, to allow the potatoes to pass between them, while at the same time they will assist in breaking up the earth and removing the tops.

J are metallic strips, (steel is best,) secured to the rear end of the cutters, and are bent with an inward and upward curvature, and are designed to receive the potatoes, &c., which may pass between the rods I, and deposit them upon the ground.

The cutter E and its attachments are so arranged that the hill under which it passes is thrown toward the opposite landside, when the cutter G and its attachments again take it up, and in turn throw it in an opposite direction, in the rear of the cutter E, leaving the potatoes in a row, ready to be picked up.

It will be seen that each hill, as it is successively taken up by the cutter E, is pulverized so that the earth is loosened from the potatoes, and is again taken up by the cutter G, so that it is twice shaken and turned, thereby the more effectually clearing the potatoes from the soil than by the ordinary and known processes.

I am aware that implements, similar in parts to mine, are in use, with double mould-boards and centre-point, with concave and convex cutters. I wish to be distinctly understood as not claiming any of the points shown in such implements; but

What I claim as my invention, and desire to secure by Letters Patent, is—

The cutters, or shares and points E and G, provided with rods I and slats J, when said cutters are arranged relatively to each other, in connection with suitable frame A, and operating substantially as and for the purposes set forth.

ROBERT DUNLAP, 1st.

Witnesses:
GEORGE VOWLES,
GUSTAVUS QUICK.